(12) United States Patent
Mizuno et al.

(10) Patent No.: US 7,499,268 B2
(45) Date of Patent: Mar. 3, 2009

(54) ELECTRONIC APPARATUS INCLUDING IMMOBILIZING MECHANISM FOR SWIVEL MECHANISM

(75) Inventors: Yusuke Mizuno, Kawasaki (JP);
Sonomasa Kobayashi, Kawasaki (JP);
Kaigo Tanaka, Kawasaki (JP); Yukihiro Ueki, Tokyo (JP); Minoru Suzuki, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/191,937

(22) Filed: Jul. 29, 2005

(65) Prior Publication Data

US 2006/0215359 A1    Sep. 28, 2006

(30) Foreign Application Priority Data

Mar. 8, 2005    (JP) .............................. 2005-063866

(51) Int. Cl.
*G06F 1/16* (2006.01)
(52) U.S. Cl. ....................................... 361/683; 345/165
(58) Field of Classification Search ................ 361/683; 345/165
See application file for complete search history.

(56) References Cited

U.S. PATENT DOCUMENTS

| | | | | |
|---|---|---|---|---|
| 6,707,665 | B2 * | 3/2004 | Hsu et al. | 361/681 |
| 7,050,295 | B2 * | 5/2006 | Kang | 361/683 |
| 7,126,816 | B2 * | 10/2006 | Krah | 361/683 |
| 7,184,262 | B2 * | 2/2007 | Hsu et al. | 361/683 |
| 2003/0142472 | A1 | 7/2003 | Park | |

FOREIGN PATENT DOCUMENTS

| | | |
|---|---|---|
| JP | 2001-325040 | 11/2001 |
| JP | 2003-241854 | 8/2003 |

* cited by examiner

*Primary Examiner*—Lisa Lea-Edmonds

(57) ABSTRACT

A second enclosure can be folded over a first enclosure based on the rotation around a rotation axis defined relative to the first enclosure. A protrusion member is guided on the second enclosure along a straight line between first and second positions. A receiving hole is defined in the first enclosure so as to receive the insertion of the protrusion member protruding out of the front or back surface of the second enclosure. Even if one end of the protrusion member collides against the first enclosure during the fold of the second enclosure over the first enclosure, the protrusion member is caused to move. The first enclosure is thus prevented from suffering from damages or scratches over the first enclosure.

14 Claims, 9 Drawing Sheets

ELECTRONIC APPARATUS INCLUDING IMMOBILIZING MECHANISM FOR SWIVEL MECHANISM

BACKGROUND OF THE INVENTION

1. Field of the Invention

The present invention relates to an electronic apparatus such as a notebook personal computer. In particular, the invention relates to an electronic apparatus including: a first enclosure; and a second enclosure capable of rotating relative to the first enclosure around a first rotation axis and a second rotation axis defined within a plane set perpendicular to the first rotation axis.

2. Description of the Prior Art

A notebook personal computer includes a main body enclosure and a display enclosure. A keyboard is exposed on the front surface of the main body enclosure. A liquid crystal display (LCD) panel is exposed on the front surface of the display enclosure. The display enclosure is coupled to the main body enclosure for relative rotation. The display enclosure is folded over the main body enclosure based on the rotation around a horizontal axis set in parallel with the front surface of the main body enclosure.

The horizontal axis is allowed to rotate around a vertical axis set perpendicular to a horizontal plane including the horizontal axis. The display enclosure is thus allowed to rotate around the vertical axis. When the display enclosure is folded over the main body enclosure, either the front or back surface of the display enclosure is received on the front surface of the main body enclosure.

A hook is located on the front surface of the display enclosure. A receiving hole is defined in the front surface of the main body enclosure. Assume that the horizontal axis is positioned at a standard position through the rotation around the vertical axis. When the display enclosure is received on the main body enclosure, the hook is received in the receiving hole. Since the hook is engaged with the main body enclosure within the receiving hole, the notebook personal computer is kept folded.

If the horizontal axis shifts from the standard position around the vertical axis prior to the fold of the display enclosure over the main body enclosure, the hook collides against the front surface of the main body enclosure in the vicinity of the receiving hole. The front surface of the main body enclosure gets damaged.

SUMMARY OF THE INVENTION

It is accordingly an object of the present invention to provide an electronic apparatus capable of avoiding damages to an enclosure.

According to the present invention, there is provided an electronic apparatus comprising: a first enclosure; a second enclosure designed to take first and second attitudes based on rotation around a first rotation axis, said second enclosure of the first attitude opposing its front surface to the front surface of the first enclosure, said second enclosure of the second attitude opposing its back surface to the front surface of the first enclosure, said second enclosure designed to rotate relative to the first enclosure around a second rotation axis defined within a plane perpendicular to the first rotation axis; a protrusion member guided on the second enclosure along a straight line, said protrusion member designed to move between first and second positions, said protrusion member allowing one end to protrude out of the front surface of the second enclosure, said protrusion member allowing other end to protrude out of the back surface of the second enclosure; and a receiving hole defined on the front surface of the first enclosure, said receiving hole designed to receive insertion of the one end of the protrusion member when the second enclosure of the first attitude is positioned at a predetermined position based on rotation around the second rotation axis.

When the second enclosure of the first attitude is positioned at the predetermined position through the rotation around the second rotation axis, the front surface of the second enclosure is received on the front surface of the first enclosure. The electronic apparatus can in this manner be folded. In this case, the receiving hole receives the insertion of the one end of the protrusion member at the first position where the protrusion member protrudes the one end out of the second enclosure. Even if an external force acts on the second enclosure around the second rotation axis, the second enclosure is prevented from rotating relative to the first enclosure around the second rotation axis. The second enclosure is thus reliably kept at the first attitude. The combination of the protrusion member and the receiving hole in this manner acts as an immobilizing mechanism of the electronic apparatus.

If the second enclosure suffers from a slight shift or relative rotation around the second rotation axis on the first enclosure from the predetermined position prior to the fold of the second enclosure over the first enclosure. In this case, when the second enclosure of the first attitude rotates around the first rotation axis on the first enclosure, the one end of the protrusion member collides against the front surface of the first enclosure. The contact of the protrusion member with the first enclosure causes the protrusion member to move from the first position to the second position. The first enclosure is thus prevented from suffering from damages or scratches over the front surface of the first enclosure.

The electronic apparatus may further comprise a rotating mechanism designed to generate a driving force to urge the second enclosure of the first attitude toward the first enclosure. The rotating mechanism serves to restrain the rotation of the second enclosure at a set position around the first rotation axis.

The protrusion member may be designed to move between the first and second positions on the second enclosure of the second attitude, said receiving hole receiving the other end of the protrusion member when the second enclosure of the second attitude is positioned at the predetermined position based on the rotation around the second rotation axis.

When the second enclosure of the second attitude is positioned at the predetermined position through the rotation around the second axis, the back surface of the second enclosure can be received on the front surface of the first enclosure. The electronic apparatus can in this manner be folded with the second enclosure reversed. The receiving hole of the first enclosure receives the insertion of the other end of the protrusion member protruding from the back surface of the second enclosure. Even if an external force acts on the second enclosure around the second rotation axis, the second enclosure is prevented from rotating relative to the first enclosure around the second rotation axis. The second enclosure is thus reliably kept at the second attitude.

If the second enclosure suffers from a slight shift or relative rotation around the second rotation axis on the first enclosure from the predetermined position prior to the fold of the second enclosure over the first enclosure. In this case, when the second enclosure of the second attitude rotates around the first rotation axis on the first enclosure, the other end of the protrusion member collides against the front surface of the first enclosure. The contact of the protrusion member with the first enclosure causes the protrusion member to move from the second position to the first position. The first enclosure is thus prevented from suffering from damages or scratches over the front surface of the first enclosure.

The electronic apparatus may further comprise a rotating mechanism designed to generate a driving force to urge the second enclosure of the second attitude toward the first enclosure. The rotating mechanism serves to restrain the rotation of the second enclosure at a set position around the first rotation axis.

The electronic apparatus may further comprise: a guiding member incorporated in the second enclosure, said guiding member designed to guide the movement of the protrusion member; a protuberance formed on the guiding member at a position opposed to the protrusion member; a first depression formed on the protrusion member, said first depression receiving the protuberance when the protrusion member takes the first position; a second depression formed on the protrusion member, said second depression receiving the protuberance when the protrusion member takes the second position; and a third depression formed at a position between the first and second depressions.

The third dimple is formed at a position between the first and second dimples on the protrusion member. The protuberance is received in the third dimple during the movement of the protuberance between the first and second dimples. Even if a larger distance is set between the first and second dimples, it is possible to reduce the deformation of the protrusion member during the movement of the protuberance. Moreover, when the protuberance is received in the third dimple, the protrusion member is held at the location between the first and second positions. The protrusion member is allowed to simultaneously protrude the opposite ends out of the front and back surfaces of the second enclosure, respectively, for example.

The protrusion member may include: a pair of first contours defining the outline of the protrusion member between the one and other ends of the protrusion member, said first contours extending in parallel with the second rotation axis on the second enclosure of the first attitude; a second contour defined in parallel with the first rotation axis so as to define the one end of the protrusion member; and a third contour connecting the first and second contours to each other.

The protrusion member can be set to align the first contour with the second axis on the second enclosure of the first attitude. The second contour can be set in parallel with the first axis. The third contour of the protrusion member thus serves to realize a so-called chamfer. Here, suppose that the second enclosure suffers from a slight shift or erroneous rotation around the second axis on the first enclosure from the predetermined position, for example. The third contour of the protrusion member is received at the opening of the receiving hole, for example. The chamfer generates as light deriving force to rotate the second enclosure around the second axis on the first enclosure so that the protrusion member is received in the receiving hole.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
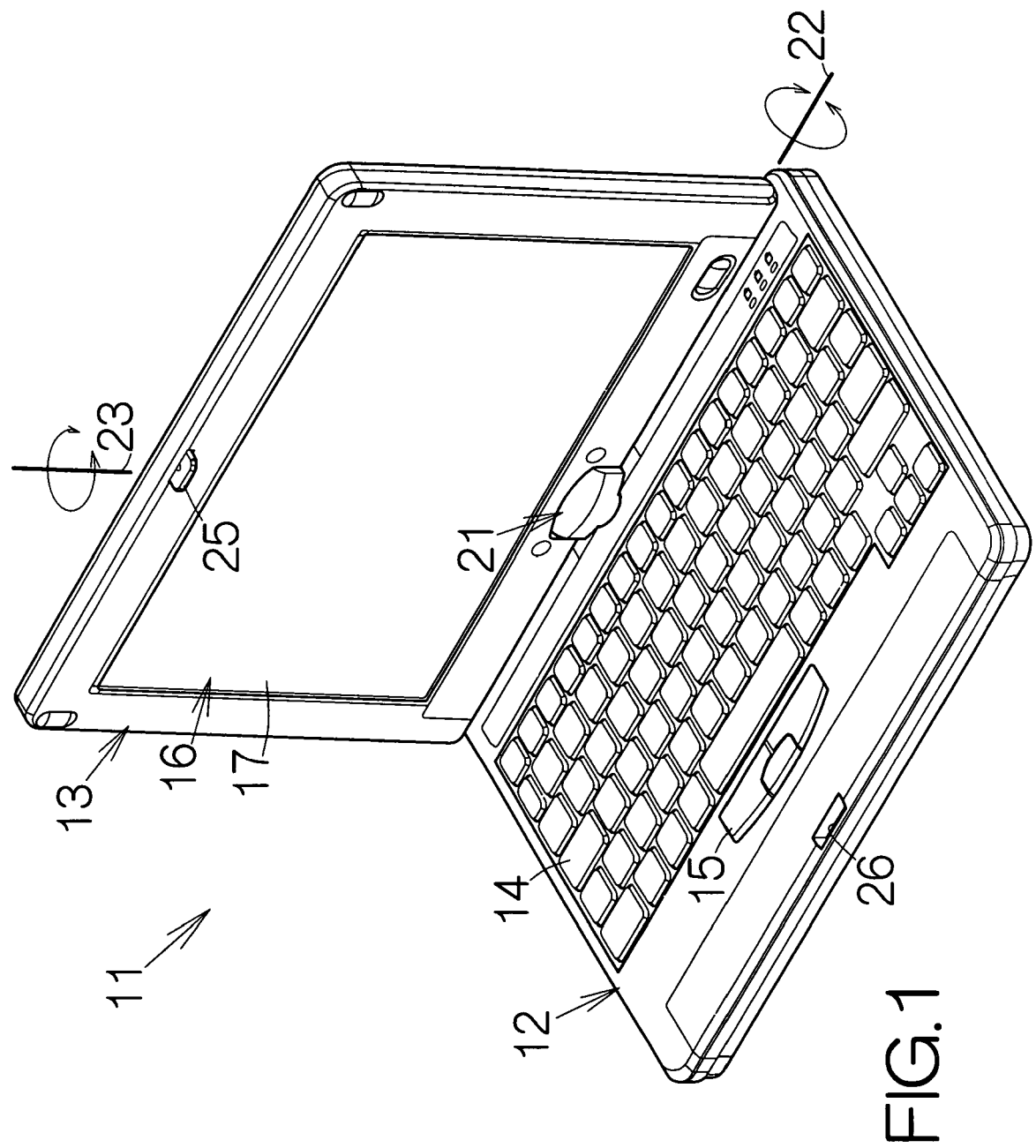
FIG. 1 is a perspective view schematically illustrating the structure of a notebook personal computer as a specific example of an electronic apparatus according to an embodiment of the present invention.

FIG. 1 schematically illustrates a notebook personal computer 11 as a specific example of an electronic apparatus according to an embodiment of the present invention. The notebook personal computer 11 includes a first enclosure or main body enclosure 12 and a second enclosure or display enclosure 13 coupled to the main body enclosure 12. The main body enclosure 12 and the display enclosure 13 may be made of a reinforced resin material such as polycarbonate, for example.

A motherboard is enclosed within the main body enclosure 12. Electronic circuit elements such as a central processing unit, CPU, a memory, and the like, are mounted on the motherboard. The central processing unit is designed to execute various processing or calculation based on software programs and/or data temporarily stored in the memory, for example. The software programs and data may be stored in a mass storage such as a hard disk drive, HDD, enclosed within the main body enclosure 12.

Input devices such as a keyboard 14, a pointing device 15, and the like, are located on the front surface of the main body enclosure 12. The keyboard 14 includes keypads arranged on an imaginary plane. The user utilizes the input devices 14, 15 so as to input various instructions and data to the central processing unit.

A flat display panel such as a liquid crystal display (LCD) panel 16, for example, is incorporated in the display enclosure 13. The LCD panel 16 defines a screen 17 exposed at the front surface of the display enclosure 13. Various texts and/or graphics can be displayed on the screen in response to the operation of the central processing unit.

An input device such as a touch screen panel 17 is placed on the front surface of the LCD panel 16. The user is allowed to manipulate the touch screen panel 17 with a stylus, a finger of the user, or the like, so as to input various instructions and data to the central processing unit.

A bi-axial swivel mechanism 21 is employed to couple the display enclosure 13 with the main body enclosure 12. The swivel mechanism 21 realizes the rotation of the display enclosure 13, relative to the main body enclosure 12, not only around a first rotation axis or horizontal axis 22 but also around a second rotation axis or vertical axis 23. Here, the horizontal axis 22 may extend in parallel with the front surface of the main body enclosure 12 at the farside of the keyboard 14. The vertical axis 23 is defined within a plane set perpendicular to the horizontal axis 22. The vertical axis 23 stands upright from the front surface of the main body enclosure 12.

A plate-shaped protrusion member 25 is incorporated in the display enclosure 13, for example. One end of the protrusion member 25 protrudes out of the front surface of the display enclosure 13. The protrusion member 25 is located at a predetermined position with reference to the horizontal axis 22. On the other hand, a receiving hole 26 is defined on the front surface of the main body enclosure 12. The receiving hole 26 is located at a predetermined position with reference to the vertical axis 23. Here, the protrusion member 25 and the receiving hole 26 serve as an immobilizing mechanism of the notebook personal computer 11.

Now, assume that the front surface of the display enclosure 13 is received on the front surface of the main body enclosure 12 through the relative rotation around the horizontal axis 22. As shown in FIG. 1, the display enclosure 13 is positioned at a first upright attitude based on the rotation around the vertical axis 23. The first upright attitude allows the receiving hole 26 and the horizontal axis 22 to take a positional relationship reflecting the positional relationship between the horizontal axis 22 and the protrusion member 25.

Figure 2:
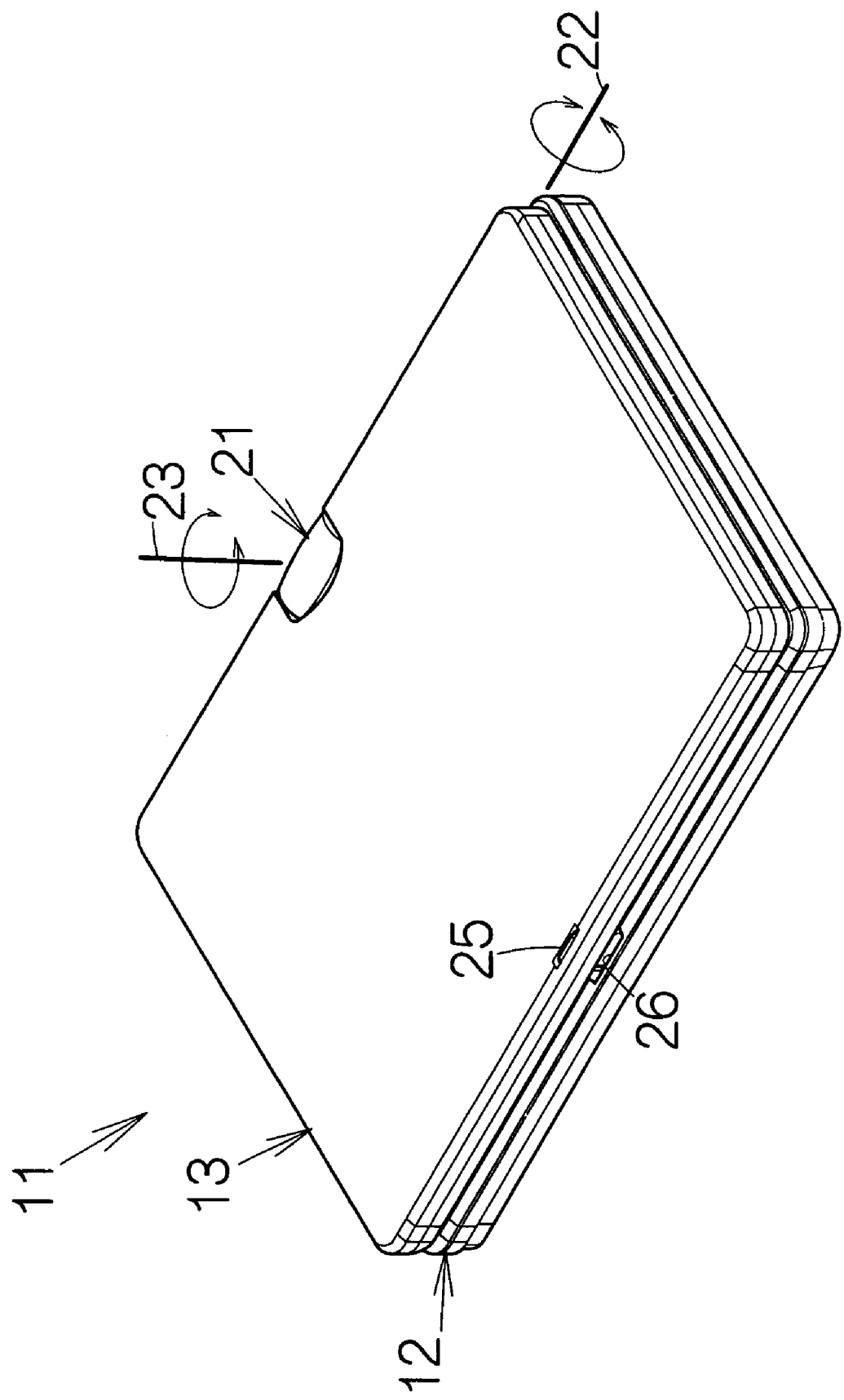
FIG. 2 is a perspective view of the notebook personal computer for schematically illustrating the display enclosure folded over the upper surface of the main body enclosure with the front surface of the display enclosure received on the front surface of the main body enclosure.

As shown in FIG. 2, the display enclosure 13 taking the first upright attitude can be folded over the main body enclosure 12 around the horizontal axis 22. The display enclosure 13 thus takes a first folded attitude. The front surface of the display enclosure 13 is received on the front surface of the main body enclosure 12. Here, since the display enclosure 13 is folded over the main body enclosure 12 after the display enclosure 13 have taken the first upright attitude around the vertical axis 23, the outline of the display enclosure 13 homologized with the outline of the main body enclosure 12. The notebook personal computer 11 can in this manner be folded.

The swivel mechanism 21 develops a driving force to urge the display enclosure 13 against the front surface of the main body enclosure 12. The driving force serves to restrict the rotation of the display enclosure 13 around the horizontal axis 22 relative to the main body enclosure 12. The swivel mechanism 21 of this type will be described later in detail.

The receiving hole 26 receives one end of the protrusion member 25 protruding out of the front surface of the display enclosure 13. Even if an external force acts on the display enclosure 13 around the vertical axis 23, the display enclosure 13 is prevented from rotating relative to the main body enclosure 12 around the vertical axis 23. The display enclosure 13 is thus kept at the first folded attitude.

Figure 3:
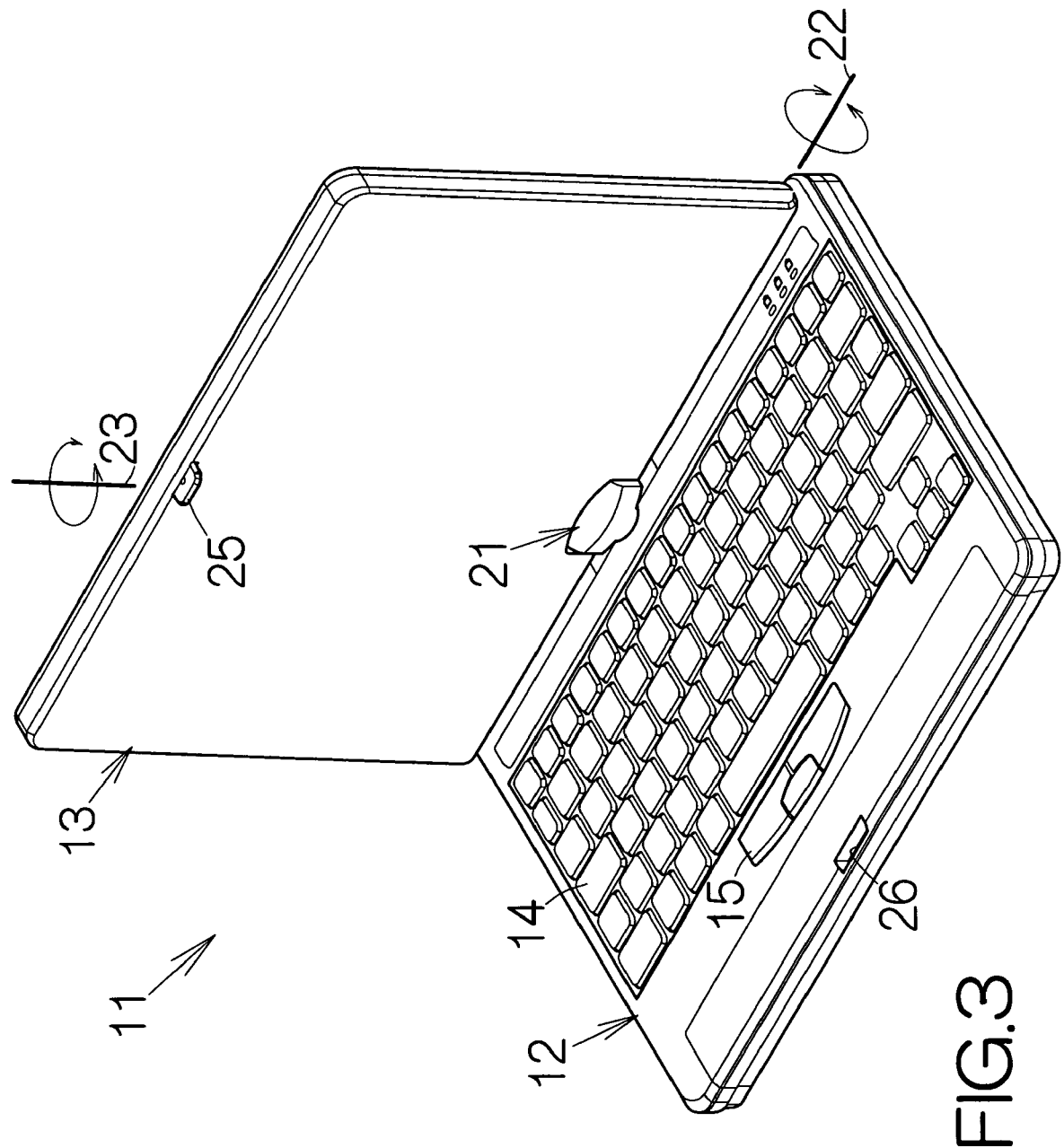
FIG. 3 is a perspective view of the notebook personal computer for schematically illustrating the display enclosure establishing a second upright attitude around the vertical axis.

As shown in FIG. 3, the display enclosure 13 is allowed to rotate around the vertical axis 23 over 180 degrees relative to the main body enclosure 12, for example. The display enclosure 13 is in this manner positioned at a second upright attitude based on the rotation around the vertical axis 23. The second upright attitude allows the receiving hole 26 and the horizontal axis 22 to take a positional relationship reflecting the positional relationship between the horizontal axis 22 and the protrusion member 25.

Figure 4:
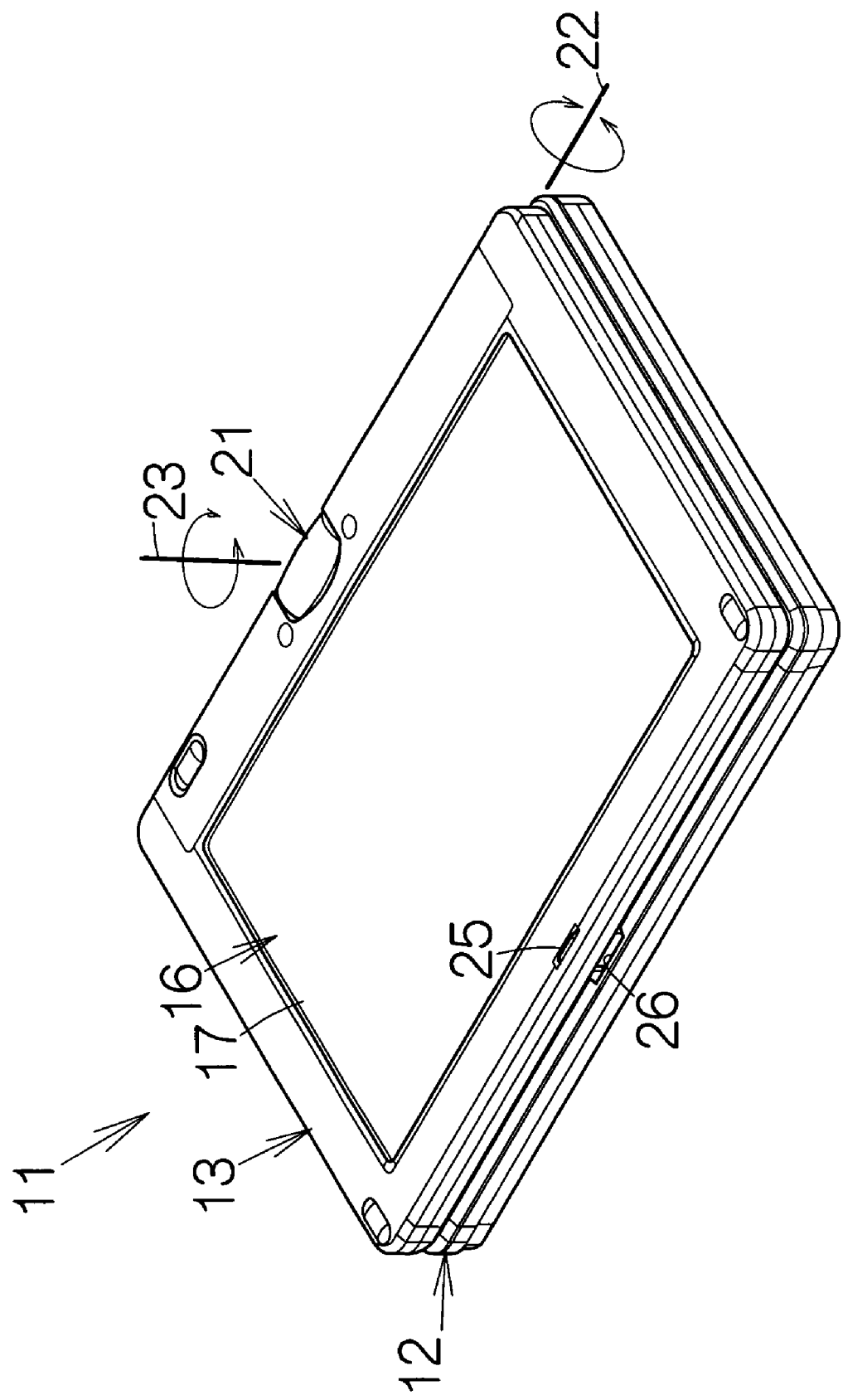
FIG. 4 is a perspective view of the notebook personal computer for schematically illustrating the display enclosure folded over the main body enclosure with the back surface of the display enclosure received on the front surface of the main body enclosure.

As shown in FIG. 4, the display enclosure 13 taking the second upright attitude can be folded over the main body enclosure 12 around the horizontal axis 22. The display enclosure 13 thus takes a second folded attitude. The back surface of the display enclosure 13 is received on the front surface of the main body enclosure 12. The notebook personal computer 11 can in this manner be folded with the display enclosure 13 reversed.

The swivel mechanism 21 develops a driving force to urge the display enclosure 13 against the front surface of the main body enclosure 12 in the same manner as described above. The driving force serves to restrict the rotation of the display enclosure 13 around the horizontal axis 22 relative to the main body enclosure 12.

The receiving hole 26 receives the other end of the protrusion member 25 protruding out of the back surface of the display enclosure 13. The display enclosure 13 is prevented from rotating relative to the main body enclosure 12 around the vertical axis 23. The display enclosure 13 is thus kept at the second folded attitude.

Figure 5:
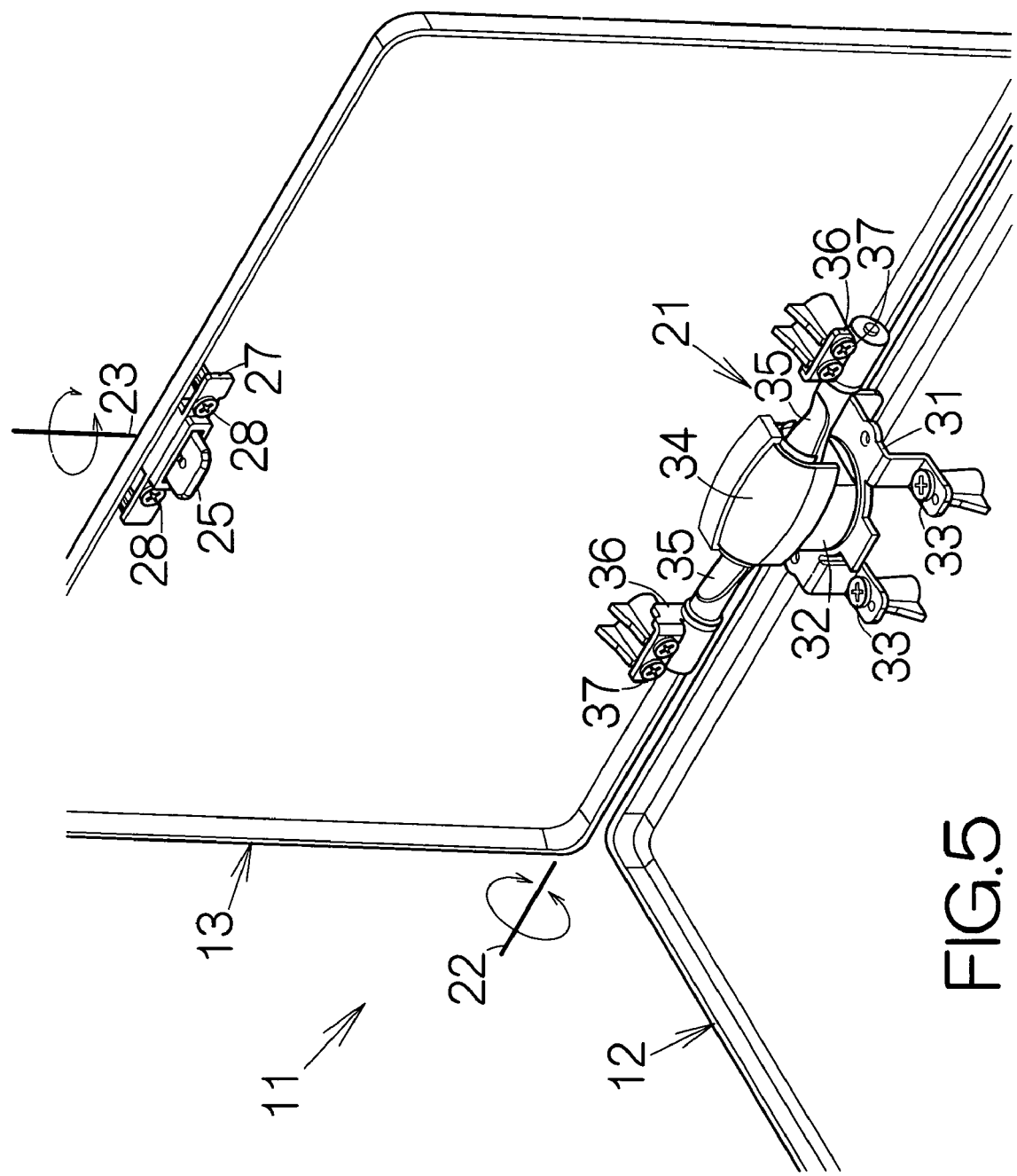
FIG. 5 is an enlarged partial perspective view of the notebook personal computer for schematically illustrating the structure of a guiding member and a swivel mechanism.

As shown in FIG. 5, the protrusion member 25 is supported in a guiding member 27. The guiding member 27 is designed to guide the movement of the protrusion member 25 along a straight line. The protrusion member 25 may be forced to move in the direction perpendicular to the front surface of the main body enclosure 12 when the display enclosure 13 has taken the first or second folded attitude. The guiding member 27 is fixed to the display enclosure 13. Screws 28 are employed to fix the guiding member 27 to the display enclosure 13, for example. The screws 28 may be received on bosses standing upright from the inside surface of the display enclosure 13.

The swivel mechanism 21 includes a bearing member 31. The bearing member 31 is designed to receive a support shaft 32 for relative rotation around the vertical axis 23. The bearing member 31 is fixed to the inside surface of the main body enclosure 12, namely the upper surface of the bottom plate of the main body enclosure 12, for example. Screws 33 are employed to fix the bearing member 31 to the main body enclosure 12, for example. The screws 33 may be received on bosses standing upright from the inside surface of the main body enclosure 12, for example. The longitudinal axis of the support shaft 32 is aligned with the vertical axis 23. A dressed cover 34 covers over the support shaft 32, for example.

A pair of shaft member 35, 35 is formed integral to the support shaft 32. The shaft members 35, 35 extend in opposite directions from the support shaft 32. The longitudinal axes of the shaft members 35 are aligned with the horizontal axis 22. A connecting piece 36 is coupled to the end of the individual shaft member 35 for relative rotation around the longitudinal axis of the shaft member 35. The connecting pieces 36 are fixed to the inside surface of the display enclosure 13. Screws 37 are employed to fix the connecting piece 36 to the display enclosure 13, for example. The screws 37 may be received on bosses standing upright from the inside surface of the display enclosure 13. Here, the support shaft 32 and the shaft members 35 may be made of a metallic material such as a stainless steel. Casting process may be employed to integrate the support shaft 32 and the shaft members 35 into a one-piece member.

The swivel mechanism 21 serves to couple the display enclosure 13 with the main body enclosure 12. When the connecting pieces 36 rotate relative to the shaft members 35, the display enclosure 13 is allowed to rotate around the horizontal axis 22 on the main body enclosure 12. When the connecting pieces 36 rotate around the longitudinal axis of the support shaft 32 on the bearing 31, the display enclosure 13 is allowed to rotate around the vertical axis 23 on the main body enclosure 12.

Figure 6A:
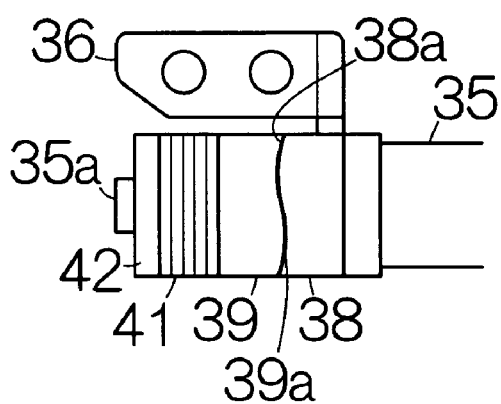
FIG. 6A is an enlarged partial front view of the swivel mechanism.
Figure 6B:
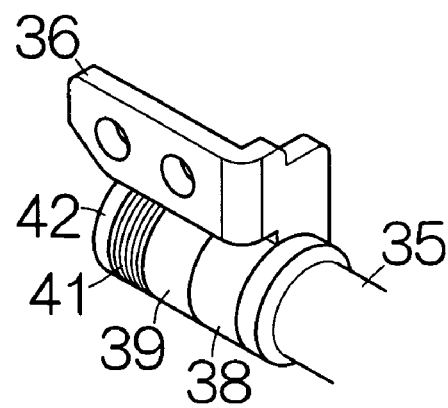
FIG. 6B is an enlarged partial perspective view of the swivel mechanism.

As shown in FIGS. 6A and 6B, the connecting piece 36 includes an annular portion 38 coupled to a stem 35a of the shaft member 35. The annular portion 38 is allowed to rotate around the longitudinal axis of the shaft member 35. An annular member 39 is supported on the stem 35a at a position outside the annular portion 38. An elastic member or spring 41 is supported on the stem 35a at a position outside the annular member 39.

An anchor 42 is fixed to the stem 35a at a position outside the spring 41. The anchor 42 serves to hold the annular portion 38, the annular member 39 and the spring 41 on the stem 35a. The rotation of the annular member 39 and the spring 41 is restricted around the longitudinal axis of the shaft member 35. The annular member 39 is allowed to move in the direction of the longitudinal axis of the shaft member 35 with the assistance of the expansion and shrinkage of the spring 41.

The inside end surface of the annular member 39 is opposed to the outside end surface of the annular portion 38 of the connecting piece 36. A cam surface 38a is formed on the outside end surface of the annular portion 38. The cam surface 38a includes depressions and swells alternately arranged around the stem 35a. Swells 39a are also formed on the inside end surface of the annular member 39. Here, the shape of the inside end surface of the annular member 39 reflects the shape of the outside end surface of the annular portion 38. Since the rotation of the annular member 39 is restricted around the longitudinal axis of the shaft member 35, the annular portion 38 is allowed to rotate relative to the annular member 39. The combination of cam surface 38a and the swells 39a establishes a so-called cam mechanism.

Figure 7A:
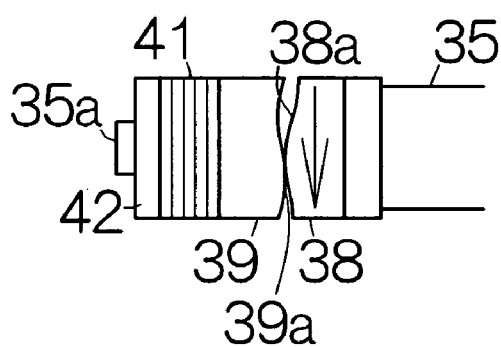
FIG. 7A is an enlarged partial front view of the swivel mechanism.
Figure 7B:
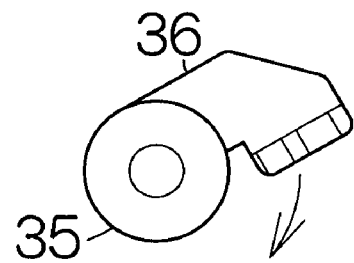
FIG. 7B is an enlarged partial side view of the swivel mechanism.
Figure 8A:
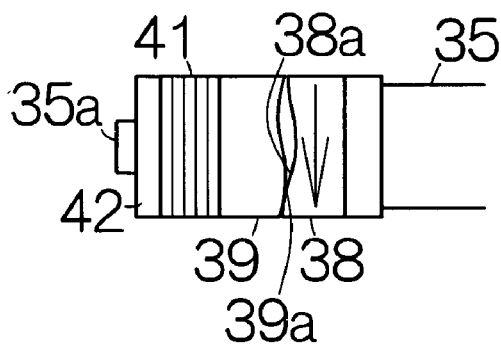
FIG. 8A is an enlarged partial front view of the swivel mechanism.
Figure 8B:
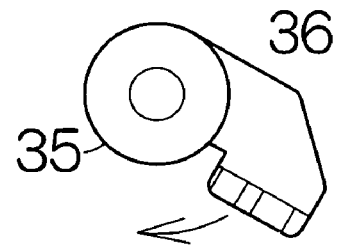
FIG. 8B is an enlarged partial side view of the swivel mechanism.

As shown in FIGS. 7A and 7B, a relative rotation is induced between the annular portion 38 and the annular member 39 in response to the rotation of the connecting piece 36 around the stem 35a. The spring 41 serves to urge the annular member 39 against the annular portion 38. The swells 39a are contacted with the swells of the cam surface 39a. As shown in FIGS. 8A and 8B, the swells 39a are then invited to move into the depressions of the cam surface 38a in response to further rotation of the annular portion 38. Since the swells 39a tends to move into the depressions, the urging force of the annular member 39 along the stem 35a can be converted into a driving force to cause the rotation of the annular portion 38. The aforementioned urging force is applied to the display enclosure 13 to as to urge the display enclosure 13 against the main body enclosure 12.

Figure 9:
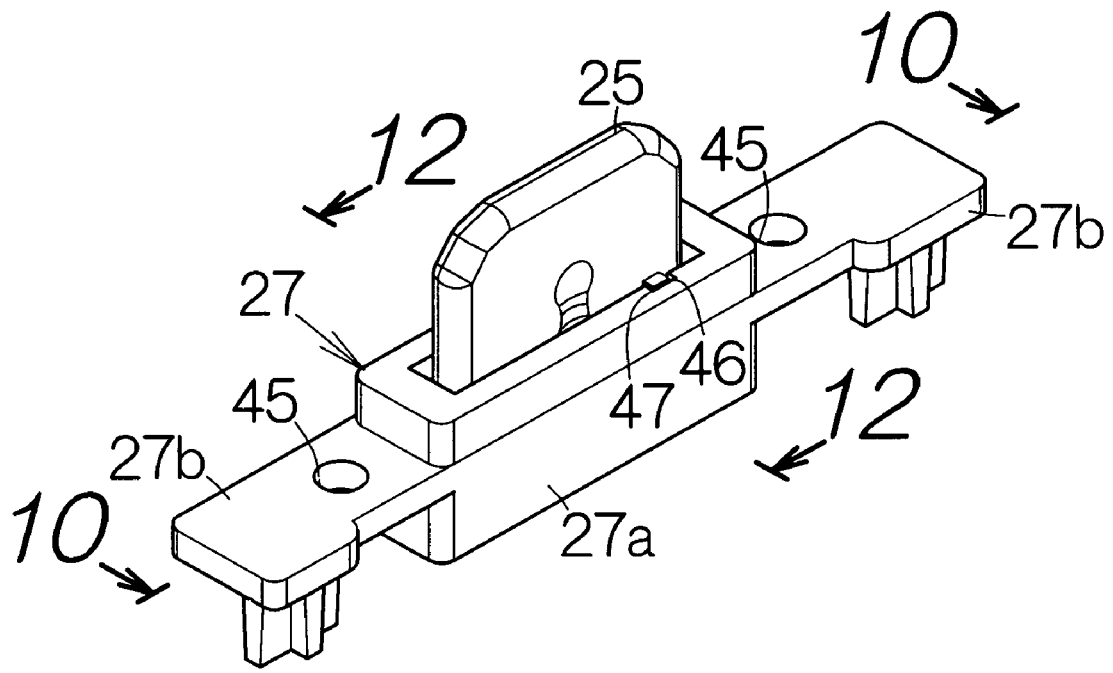
FIG. 9 is a perspective view schematically illustrating the structure of the guiding member receiving a protrusion member.

FIG. 9 schematically illustrates the structure of the guiding member 27. The guiding member 27 includes a receiving frame member 27a supporting the protrusion member 25. A pair of plate members 27b, 27b extend in opposite directions from the receiving frame member 27a. The receiving frame member 27a is designed to define an inner space of a flat rectangular parallelepiped. The receiving frame member 27a receives the protrusion member 25 within the inner space. The receiving frame member 27a and the plate members 27b may be integrated into a one-piece member through molding process, for example. A through hole 45 is formed in each plate member 27b so as to receive the aforementioned screw 28. The protrusion member 25 and the guiding member 27 may be made of a synthetic resin material, for example.

A guiding protrusion 46 is formed on the back surface of the protrusion member 25. The guiding protrusion 46 is received in a guiding groove 47 formed on the inside surface of the receiving frame member 27a. The guiding groove 47 is formed over the full length of the receiving frame member 27a along the direction of the movement of the protrusion member 25, namely along the aforementioned straight line. The guiding member 27 thus guides the movement of the protrusion member 25 along the straight line based on the cooperation of the guiding protrusion 46 and the guiding groove 47.

Figure 10:
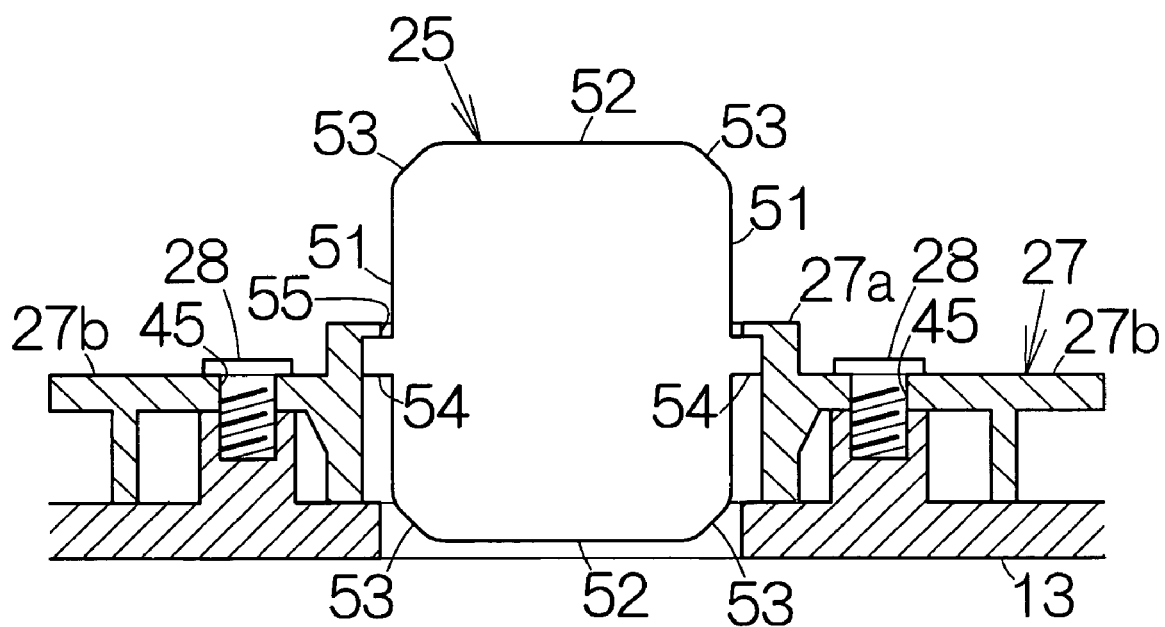
FIG. 10 is a sectional view taken along the line 10-10 in FIG. 9.

Referring also to FIG. 10, the protrusion member 25 includes a pair of first contours 51, 51 defining the outline of the protrusion member 25 between the upper and lower ends of the protrusion member 25. The first contours 51 extend in parallel with the vertical axis 23 established in the display enclosure 13 of the first upright attitude. The protrusion member 25 also includes a pair of second contours 52, 52 set in parallel with the horizontal axis 22. The second contours 52 define the upper and lower ends of the protrusion member 25.

The protrusion member 25 further includes a third contours 53 connecting the first and second contours 51, 52 to each other. The third contours 53 thus serve as so-called chamfers. Here, the first and second contours 51, 52 may be defined along straight lines. The third contours 53 may likewise be defined along straight lines. Alternatively, the third contours 53 may be defined along curves, for example.

A pair of protruding piece 54, 54 is formed on the opposite sides of the protrusion member 25 at intermediate positions between the upper and lower ends of the protrusion member 25, respectively. Restriction walls 55 are formed on the receiving frame member 27a at one ends of the paths of movement of the protruding pieces 54. The restriction walls 55 protrude inward from the inside surface of the receiving frame member 27a toward the protrusion member 25. When the protrusion member 25 is positioned at a first position, the protruding pieces 54 get engaged with the corresponding restriction walls 55. The protrusion member 25 is thus reliably prevented from slipping off the receiving frame member 27a.

The receiving frame member 27a is received on the inside surface of the display enclosure 13. When the protrusion member 25 is positioned at a second position, the protruding pieces 54 get engaged with the inside surface of the display enclosure 13. The protrusion member 25 is thus reliably prevented from slipping off the receiving frame member 27a.

Figure 11:
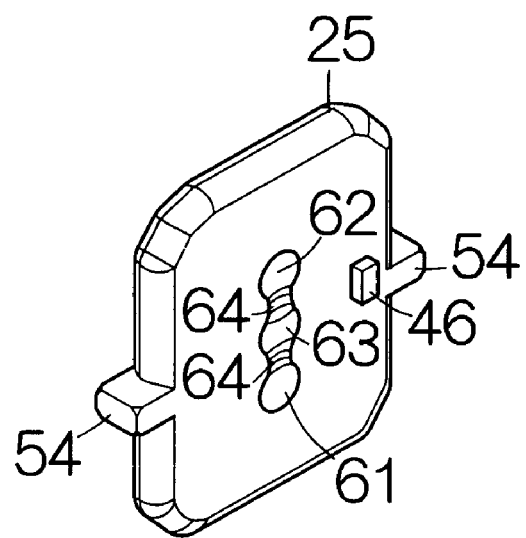
FIG. 11 is a perspective view schematically illustrating the detailed structure of the protrusion member.

As shown in FIG. 11, first dimples 61 are formed on the front and back surface of the protrusion member 25, respectively. Second dimples 62 are likewise formed on the front and back surfaces of the protrusion member 25, respectively. Third dimples 63 are formed on the corresponding front and back surfaces of the protrusion member 25 at positions between the first and second dimples 61, 62. The first, second and third dimples 61, 62, 63 are located in a row on a straight line on the front and back surfaces of the protrusion member 25, respectively. The first, second and third dimples 61, 62, 63 are shaped in a hemisphere.

Connecting grooves 64, 64 are also formed on the front and back surfaces of the protrusion member 25 between the first and third dimples 61, 63 and between the third and second dimples 63, 62. The connecting grooves 64 connect the first dimple 61 to the third dimple 63 and connect the third dimple 63 to the second dimple 62. The first, second and third dimples 61, 62, and 63 are formed deeper from the front surface of the protrusion member 25 than the connecting grooves 64.

Figure 12:
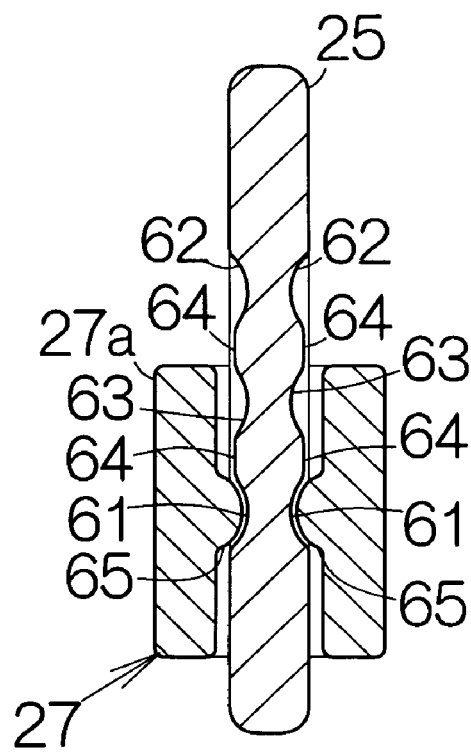
FIG. 12 is a sectional view taken along the line 12-12 in FIG. 9.

As shown in FIG. 12, a pair of domed protuberance 65, 65 is formed on the inside surfaces of the receiving frame member 27a at positions opposed to the front and back surfaces of the protrusion member 25, respectively, for example. The protuberances 65 swell from the inside surface within the inner space of the receiving frame member 27a. The first dimples 61 on the protrusion member 25 of the first position receive the protuberances 65, respectively. The second dimples 62 on the protrusion member 25 of the second position receive the protuberances 65, respectively. The protuberance 65 is in this manner forced to follow the path comprising the combination of the first, second and third dimples 61, 62, 63 and the connecting grooves 64.

When the protrusion member 25 is positioned at the first position, the protuberances 65 are received in the corresponding first dimples 61. The subsequent movement of the protrusion member 25 from the first position toward the second position allows the protuberances 65 to be sequentially received in the third dimples 63 and the second dimples 62 next to the first dimples 61. The protrusion member 25 of the type allows the third dimple 63 to receive the protuberance 65 at a position between the first and second dimples 61, 62. Accordingly, even if a larger distance is set between the first and second dimples 61, 62, it is possible to reduce the deformation of the protuberances 65 and the protrusion member 25 during the movement between the first and second positions.

Moreover, when the protuberances 65 are received in the third dimples 54, the protrusion member 25 can be kept in an intermediate position between the first and second positions. The protrusion member 25 simultaneously allows one end of the protrusion member 25 to protrude out of the front surface of the display enclosure 13 and the other end of the protrusion member 25 to protrude out of the back surface of the display enclosure 13. The protrusion member 25 should thus have the length between the one and other ends enough to allow the one and other end to simultaneously protrude out of the front and back surfaces of the display enclosure 13.

Molding process is employed to form the protrusion member 25, for example. There is a mark of a knock pin remaining on the back surface of the protrusion member 25, for example. In this case, when the protrusion member 25 is to be assembled within the guiding member 27, the guiding protrusion 46 and the guiding groove 47 serves to restrict the attitude of the protrusion member 25. When the back surface of the protrusion member 25 is set on the farside of the notebook personal computer 11 from the user, the mark of the knock pin is hidden from the users. The appearance of the protrusion member 25 is prevented from suffering from a deteriorated appearance.

Figure 13:
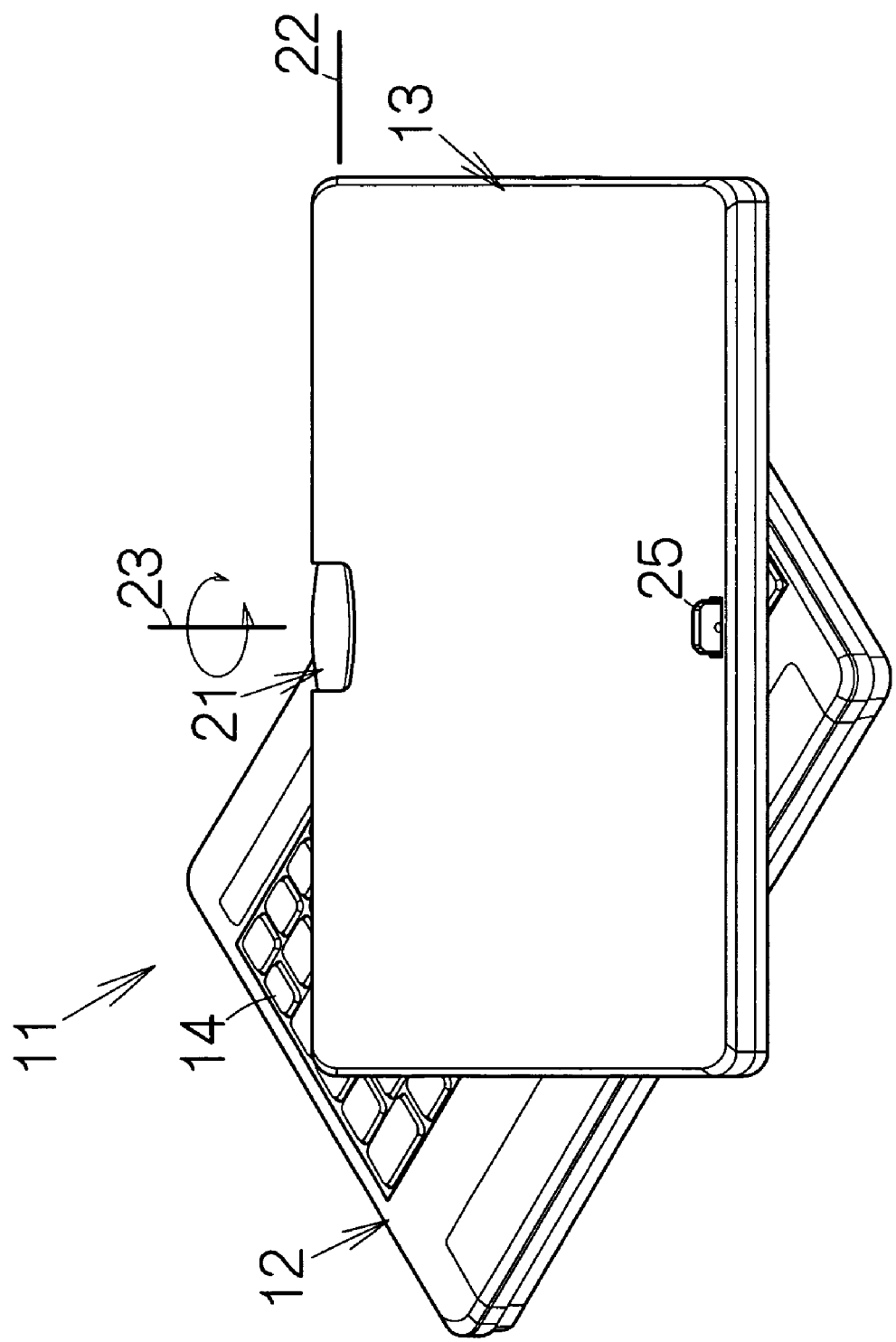
FIG. 13 is a perspective view of the notebook personal computer for schematically illustrating the display enclosure folded over the main body enclosure after the display enclosure has rotated around the vertical axis.

The notebook personal computer 11 of the type is supposed to suffer from a shift or erroneous rotation of the display enclosure 13 from the first upright attitude around the vertical axis 23 prior to the fold of the display enclosure 13 over the main body enclosure 12, for example. In this case, if the display enclosure 13 is driven to rotate around the horizontal axis 22 so that the display enclosure 13 is folded over the main body enclosure 12, one end of the protrusion member 25 collides against the front surface of the main body enclosure 12. The contact of the protrusion member 25 with the main body enclosure 12 causes the protrusion member 25 to move from the first position to the second position, as shown in FIG. 13. The main body enclosure 12 is thus prevented from suffering from damages or scratches over the front surface of the main body enclosure 12. Even when the other end of the protrusion member 25 collides against the front surface of the main body enclosure 12 during the fold of the reversed display enclosure 13 over the main body enclosure 12, the contact also causes the protrusion member 25 to move from the second position to the first position. The main body enclosure 12 is thus reliably prevented from suffering from damages or scratches over the front surface of the main body enclosure 12.

Figure 14:
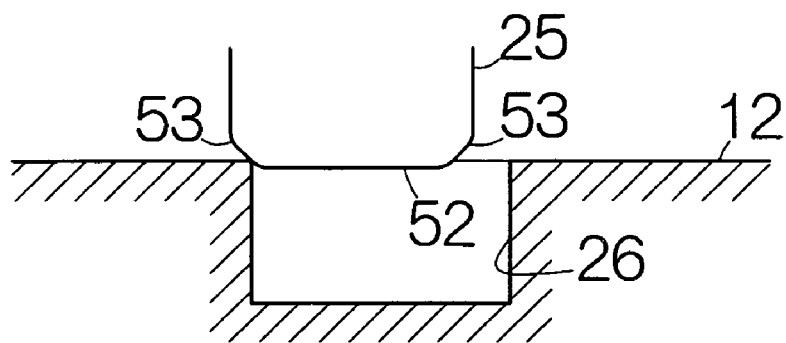
FIG. 14 is a view schematically illustrating the protrusion member received in a receiving hole.

If the display enclosure 13 suffers from a slight shift or erroneous rotation from the first or second upright attitude around the vertical axis 23, the third contour 53 of the protrusion member 25 is received at the opening of the receiving hole 26, as shown in FIG. 14. The chamfer generates a slight driving force to rotate the display enclosure 13 around the vertical axis 23 on the main body enclosure 12 so that the protrusion member 25 is received in the receiving hole 26. The insertion of the protrusion member 25 into the receiving hole 26 is thus promoted.

If the display enclosure 13 is frequently folded over the main body enclosure 12 with either the front or back surface of the display enclosure received on the front surface of the main body enclosure 12, the protrusion member 25 may be kept at an intermediate position where the protrusion member 25 simultaneously protrudes the opposite ends or upper and lower ends of the protrusion member 25 out of the front and back surfaces of the display enclosure 13. In this case, the protuberances 65 may be received in the corresponding third dimples 54 in the aforementioned manner. The user needs not adjust the position of the protrusion member 25 relative to the receiving hole 26 prior to the fold of the display enclosure 13 over the main body enclosure 12.

It should be noted that the electronic apparatus according to the present invention may include, in addition to the aforementioned notebook personal computer 11, a cellular phone terminal, a personal digital assistance, PDA, and the like.

What is claimed is:

1. An electronic apparatus comprising:
a first enclosure;
a second enclosure designed to take first and second attitudes based on the rotation around the first rotation axis, said second enclosure of the first attitude opposing its front surface to a front surface of the first enclosure, said second enclosure of the second attitude opposing its back surface to the front surface of the first enclosure, said second enclosure designed to rotate relative to the first enclosure around a second rotation axis defined within a plane perpendicular to the first rotation axis;
a protrusion member guided on the second enclosure along a straight line, said protrusion member designed to move between first and second positions, said protrusion member allowing one end to protrude out of the front surface of the second enclosure, said protrusion member allowing other end to protrude out of the back surface of the second enclosure;
a receiving hole defined on the front surface of the first enclosure, said receiving hole designed to receive insertion of the one end of the protrusion member when the second enclosure of the first attitude is positioned at a predetermined position based on rotation around the second rotation axis; and
a rotating mechanism designed to generate a driving force to urge the second enclosure of the first attitude toward the first enclosure.

2. The electronic apparatus according to claim 1, wherein said protrusion member is designed to move between the first and second positions on the second enclosure of the second attitude, said receiving hole receiving the other end of the protrusion member when the second enclosure of the second attitude is positioned at the predetermined position based on the rotation around the second rotation axis.

3. The electronic apparatus according to claim 1, further comprising:
   a guiding member incorporated in the second enclosure, said guiding member designed to guide movement of the protrusion member;
   a protuberance formed on the guiding member at a position opposed to the protrusion member;
   a first depression formed on the protrusion member, said first depression receiving the protuberance when the protrusion member takes the first position;
   a second depression formed on the protrusion member, said second depression receiving the protuberance when the protrusion member takes the second position; and
   a third depression formed at a position between the first and second depressions.

4. The electronic apparatus according to claim 1, wherein said protrusion member includes:
   a pair of first contours defining an outline of the protrusion member between the one and other ends of the protrusion member, said first contours extending in parallel with the second rotation axis on the second enclosure of the first attitude;
   a second contour defined in parallel with the first rotation axis so as to define the one end of the protrusion member; and
   a third contour connecting the first and second contours to each other.

5. The electronic apparatus according to claim 1, wherein said protrusion member simultaneously allowing the one end to protrude out of the front surface of the second enclosure and the other end to protrude out of the back surface of the second enclosure when the protrusion member is positioned at an intermediate position between the first and second positions.

6. The electronic apparatus according to claim 1, further comprising:
   a keyboard incorporated in the first enclosure at a position opposed to the second enclosure; and
   a display enclosed in the second enclosure, said display defining a screen exposed at the front surface of the second enclosure.

7. The electronic apparatus according to claim 1, wherein the rotating mechanism includes an elastic member generating a driving force to urge the second enclosure of the first attitude toward the first enclosure.

8. An immobilizing mechanism for an electronic apparatus, said electronic apparatus including a first enclosure and a second enclosure designed to take first and second attitudes based on rotation around a first rotation axis, said second enclosure of the first attitude opposing its front surface to a front surface of the first enclosure, said second enclosure of the second attitude opposing its back surface to the front surface of the first enclosure, said second enclosure designed to rotate relative to the first enclosure around a second rotation axis defined within a plane perpendicular to the first rotation axis, said immobilizing mechanism comprising:
   a protrusion member guided on the second enclosure along a straight line, said protrusion member designed to move between first and second positions, said protrusion member allowing one end to protrude out of the front surface of the second enclosure, said protrusion member allowing other end to protrude out of the back surface of the second enclosure; and
   a receiving hole defined on the front surface of the first enclosure, said receiving hole designed to receive insertion of the one end of the protrusion member when the second enclosure of the first attitude is positioned at a predetermined position based on rotation around the second rotation axis;
   wherein the electronic apparatus further including a rotating mechanism designed to generate a driving force to urge the second enclosure of the first attitude toward the first enclosure.

9. The immobilizing mechanism for the electronic apparatus according to claim 8, wherein the rotating mechanism includes an elastic member generating a driving force to urge the second enclosure of the first attitude toward the first enclosure.

10. An electronic apparatus comprising:
    a first enclosure;
    a second enclosure designed to take first and second attitudes based on rotation around a first rotation axis, said second enclosure of the first attitude opposing its front surface to a front surface of the first enclosure, said second enclosure of the second attitude opposing its back surface to the front surface of the first enclosure, said second enclosure designed to rotate relative to the first enclosure around a second rotation axis defined within a plane perpendicular to the first rotation axis;
    a protrusion member guided on the second enclosure along a straight line, said protrusion member designed to move between first and second positions, said protrusion member allowing one end to protrude out of the front surface of the second enclosure, said protrusion member allowing other end to protrude out of the back surface of the second enclosure; and
    a receiving hole defined on the front surface of the first enclosure, said receiving hole designed to receive insertion of the one end of the protrusion member when the second enclosure of the first attitude is positioned at a predetermined position based on rotation around the second rotation axis, wherein
    said protrusion member includes:
    a pair of first contours defining an outline of the protrusion member between the one and other ends of the protrusion member, said first contours extending in parallel with the second rotation axis on the second enclosure of the first attitude;
    a second contour defined in parallel with the first rotation axis so as to define the one end of the protrusion member; and
    a third contour connecting the first and second contours to each other.

11. The electronic apparatus according to claim 10, wherein said protrusion member is designed to move between the first and second positions on the second enclosure of the second attitude, said receiving hole receiving the other end of the protrusion member when the second enclosure of the second attitude is positioned at the predetermined position based on the rotation around the second rotation axis.

12. The electronic apparatus according to claim 10, further comprising:
    a guiding member incorporated in the second enclosure, said guiding member designed to guide movement of the protrusion member;
    a protuberance formed on the guiding member at a position opposed to the protrusion member;

a first depression formed on the protrusion member, said first depression receiving the protuberance when the protrusion member takes the first position;

a second depression formed on the protrusion member, said second depression receiving the protuberance when the protrusion member takes the second position; and a third depression formed at a position between the first and second depressions.

13. The electronic apparatus according to claim 10, wherein said protrusion member simultaneously allowing the one end to protrude out of the front surface of the second enclosure and the other end to protrude out of the back surface of the second enclosure when the protrusion member is positioned at an intermediate position between the first and second positions.

14. The electronic apparatus according to claim 10, further comprising:

a keyboard incorporated in the first enclosure at a position opposed to the second enclosure; and a display enclosed in the second enclosure, said display defining a screen exposed at the front surface of the second enclosure.

* * * * *